INVENTOR.
ALBERT WINKLER
BY
Zoltan Holschsky
ATTORNEY

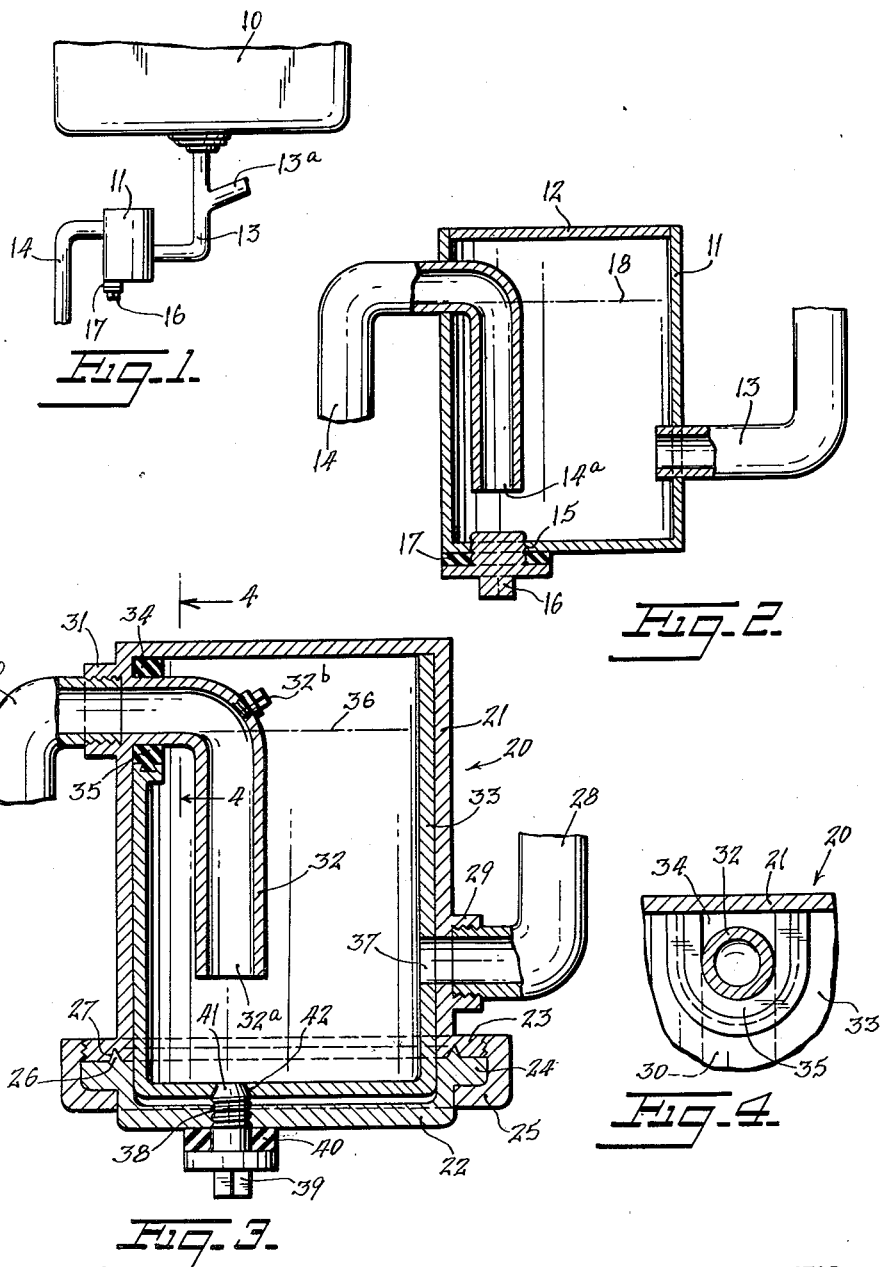

Patented July 13, 1954

2,683,534

UNITED STATES PATENT OFFICE 2,683,534

TRAP FOR SINKS

Albert Winkler, Brooklyn, N. Y.

Substituted for application Serial No. 102,623, July 1, 1949. This application August 23, 1951, Serial No. 243,228

4 Claims. (Cl. 210—56)

This invention relates to new and useful improvements in traps for sinks or the like. This is a substitute for my previous application filed on July 1, 1949, Serial Number 102,623.

Prior to the present invention, it has been found that numerous cloggings have developed in household plumbing caused by the hardened accumulations of grease in the pipes beyond the conventional traps resulting in unnecessary expense in obtaining the services of qualified plumbers to relieve the congestion. The present invention proposes an improved trap especially for kitchen sinks which will act to hold back grease which enters the trap along with the discharging water permitting the water to freely discharge, which grease can then be periodically removed from the trap by opening the bottom thereof eliminating the above objection to the present traps.

The traps of the present invention are characterized by a hollow casing having a water inlet closely adjacent the bottom thereof and a water outlet pipe entering the casing at one side thereof adjacent the top and having its mouth opening positioned closely adjacent the bottom of the casing so that the grease which enters the trap with the water will float on the surface of the water above the mouth opening of the outlet pipe in a manner so that only the waste water will enter the outlet pipe leaving the grease floating on the surface of the water which normally remains in the trap.

Another object of the present invention proposes forming the hollow casing with a closed discharge opening at its bottom arranged in a manner to be periodically opened to permit the water which normally remains in the trap together with the accumulated grease to drain therefrom for cleaning out the trap.

The invention further proposes locating the discharge opening in the bottom wall of the hollow casing immediately below the mouth opening of the outlet pipe in a manner so that when the discharge opening is opened a wire may be passed into the casing and into the mouth opening of the outlet pipe to relieve any congestion that might develop in the outlet pipe.

Still another object of the invention proposes providing the hollow casing with an inner cup-shaped member in which the accumulated grease will collect when the water is drained therefrom.

A further object of the present invention proposes forming the casing of separate sections releasably connected together so that they can be separated in a manner to permit the cup-shaped member to be removed from the interior of the casing to be cleaned of its accumulation of grease.

Still further, the present invention proposes constructing a trap embodying the features of the present invention and having a top opening through which the interior of the casing can be cleaned in a manner to be used beneath such sinks where the space below the trap is limited.

It is a further object of the present invention to provide a grease trap for sinks or the like which is efficient in operation, which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a partial elevational view of a sink provided with a grease trap in accordance with the present invention.

Fig. 2 is a vertical sectional view of the trap, per se.

Fig. 3 is a vertical sectional view similar to Fig. 2, but illustrating the grease trap constructed in accordance with a modification of the present invention.

Fig. 4 is a partial vertical sectional view taken on the line 4—4 of Fig. 3.

Figure 5:
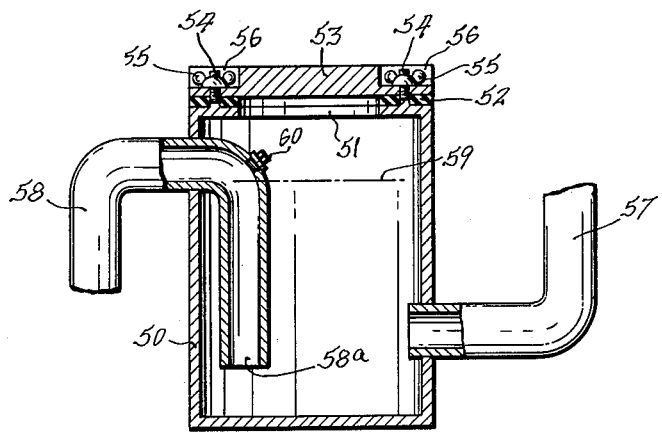
Fig. 5 is another vertical sectional view similar to Fig. 2, but illustrating the grease trap constructed in accordance with a still further modification of the present invention.

The grease trap for sinks or the like, according to the first form of the invention illustrated in Figs. 1 and 2, is shown connected to a sink 10. The sink might be a kitchen sink or any other sink or plumbing fixture from which quantities of grease discharge along with the usual waste water.

The trap, of the present invention, includes a hollow casing 11 of any desired cross-sectional shape, but preferably round. The top of the casing 11, is open but permanently closed by a flat disc 12 which is welded, soldered, braised or in any other manner secured to the casing 11.

A water inlet pipe 13 extends from the sink 10 and enters the side of the casing 11 at one side thereof and closely adjacent the bottom of the casing. The water together with the accumulated grease which discharges from the sink 10 will pass through the water inlet pipe 13 and into the casing 10. As shown in Fig. 1, the water inlet pipe 13 could be provided with a branch 13ª which could be connected with another sink or similar plumbing fixture.

A water outlet pipe 14 enters the side of the casing 11 closely adjacent the top thereof and has its other end connected to the usual sewerage system to carry away the waste water as is generally known to those skilled in the art to which the present invention pertains. The mouth 14ª of the outlet pipe, within the casing 11, is located closely adjacent the bottom of the casing so that the water will enter the outlet pipe 14 from the bottom thereof.

The bottom of the casing 11 is formed with a closed discharge opening 15 which is closed by a plug 16 which is threaded in position. The plug 16 carries the usual resilient washer 17 which engages the bottom face of the casing 11 sealing the discharge opening 15.

The discharge opening 15 is located directly below the mouth opening 14ª of the outlet pipe 14. Thus, when the plug 16 is removed a length of flexible wire can be passed upward through the discharge opening 15 and into the mouth 14ª of the outlet pipe 14 to be forced into the outlet pipe to relieve any congestion that might develop in that pipe.

The operation of this first form of the invention is as follows:

The water accumulated in the casing 11 will rise to the level indicated by the dot and dash line 18 in Fig. 2. As grease floats on water, any grease which enters the casing 11 from the inlet pipe 13 will immediately rise in the casing 11 and float on the surface of the water. The waste water below the floating grease will enter the mouth 14ª of the outlet pipe 14 and be carried to the sewerage system with which the outlet pipe is connected. As water will always be accumulated in the casing to the level of the line 18, the accumulated grease floating on the surface of the water will never enter the outlet pipe 14.

To clean the casing 11 of the accumulated grease, it is merely necessary to remove the plug 16 allowing the accumulated grease and water to discharge through the opening 15 into a pail or bucket placed beneath the trap.

In the modification of the invention shown in Figs. 3 and 4, the grease trap is characterized by a casing 20 comprising an upper section 21 and a removable bottom section 22. The contacting edges of the sections 21 and 22 are formed with adjacent flanges 23 and 24. A securing ring 25 is engaged over the flange 24 and has threaded engagement with the flange 23 for connecting the bottom section 22 to the top section 21. The top face of the bottom flange 24 is formed with a circular triangularly shaped projection 26 which engages a complementary groove 27 in the flange 23 for sealing the contacting faces of the flanges 23 and 24 against water leakage.

A water inlet pipe 28 leading from a sink or other plumbing fixture, not shown, is threaded into a boss 29 integrally formed with the upper section 21 of the casing and closely adjacent the bottom thereof. Likewise, an outlet pipe 30 is threaded into a boss 31 formed on the side of the upper section 21 of the casing 20 closely adjacent the top thereof. Internally, the top section 21 of the casing 20 is formed with an outlet tube 32 which forms an inner extension of the outlet pipe 30 and which has its mouth opening 32ª located within the casing 20 closely adjacent its bottom.

At the bend in the outlet tube 32, within the casing 20, there is threadedly mounted a removable plug 32ᵇ which is adapted to be removed when the bottom casing section 22 is separated from the upper casing section 21. When the plug 32ᵇ is removed it is possible to insert a wire into the outlet pipe 30 for relieving congestions that might develop therein without first passing the wire upward through the outlet tube 32.

Within the casing 20 there is a cup-shaped member 33 formed at its top with a cutout 34 through which the outlet tube 32 extends. Mounted on the material of the cup-shaped member 33 which defines the cutout 34 there is a strip of rubber 35 which is to be pressed about the bottom half of the outlet tube 32 to seal the engagement of the bottom portion of the cutout with the tube 32 to prevent water leakage. It is only necessary to seal the bottom half of the outlet tube 32 as water will only remain in the cup-shaped member up to the level indicated by the line 36, in Fig. 3.

The cup-shaped member 33 is further formed with a hole 37 aligned with the discharging end of the inlet pipe 28 so that the water and grease discharging from the inlet pipe 28 will flow into the cup-shaped member 33. The construction of the cup-shaped member 33 is such that when the cutout 34 is engaged about the outlet tube 32 then the hole 37 will be properly aligned with the discharging end of the inlet pipe 28, as clearly shown in Fig. 3.

The bottom of the bottom section 22 of the casing 20 is formed with a discharge opening 38 closed by means of a plug 39 threaded into the discharge opening 38. The plug 39 carries the usual rubber washer 40 which engages the bottom face of the casing 20 sealing the engagement of the plug 39 with the casing to prevent water leakage.

The inner end of the plug 39 is formed with a frusto-conical portion 41 and the bottom of the cup-shaped member 33 is formed with a corresponding opening 42 engaged by the frusto-conical portion 41. When the plug 39 is tightened into position in the discharge opening 38, as shown in Fig. 3, the frusto-conical portion 41 will be engaged in the opening 42 raising the cup-shaped member 33 slightly relative to the casing 20 and compressing the strip of rubber 35 about the bottom half of the outlet tube 32. When the plug 39 is removed from the discharge opening 38, the cup-shaped member 33 will drop downward and rest on the bottom wall of the bottom section 22 with its opening 42 aligned with the discharge opening 38 so that the accumulated water and grease can be discharged therefrom.

However, if all of the grease does not discharge through the aligned opening 42 and discharging opening 38 then the bottom section 22 is removed from the upper section 21 permitting the cup-shaped member 33 to be removed from the casing 20 for a thorough internal cleaning. After cleaning, the parts are returned to their starting position as shown in Fig. 3 of the drawing.

As in the previous form of the invention, the discharge openings 38 and 42 are located directly below the mouth opening 32ª of the outlet tube 32. Thus, when the plug 39 is removed a length of flexible wire can be passed upward through the aligned discharge openings 38 and 42 and into the mouth 32ª of the outlet tube 32 to relieve any congestion that might develop in the outlet tube and in the outlet pipe 30.

In other respects the operation of the modification of the invention shown in Figs. 3 and 4 is identically the same as that described in connection with the first form of the invention and the foregoing description of the operation of that first form of the invention applies equally well to the latter form of the invention.

Figure 6:
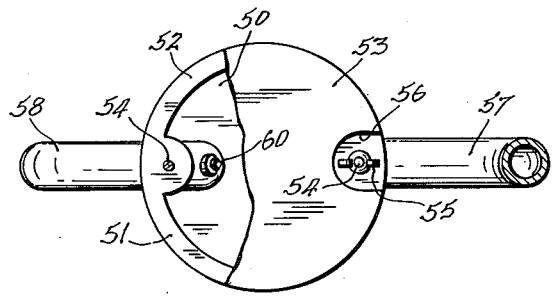
Fig. 6 is a plan view of Fig. 5 having a portion of the top cover broken away to reveal interior constructions.

In the modification of the invention shown in Figs. 5 and 6, the grease trap is in many ways similar to that illustrated in Figs. 1 and 2, except that the trap of this modified form of the invention is designed primarily for use in connection with plumbing fixtures in which there is very little room below the trap.

The trap of this further modification of the invention is comprised of a hollow casing 50, which is preferably round in horizontal cross-section, and which has an open top. The top of the casing 50 is surrounded by an inwardly directed flange 51 upon which a rubber sealing gasket 52 is rested. A flat cover 53 is rested on the gasket 52 for closing the open top of the casing 50.

Means is provided for removably retaining the cover 53 in position upon the open top of the casing 50. The removable retaining means comprises threaded studs 54 which extend upward from diametrically opposite sides of the flange 51 and which pass through the gasket 52 and through openings formed in diametrically opposite sides of the cover 53. Threaded onto the top ends of the studs 54 there are winged nuts 55 for securing the cover 53 in position. The top ends of the studs 54 and the winged nuts 55 are disposed within recesses 56 formed in diametrically opposite sides of the cover 53 so that no part of the securing means extends above the top face of the cover 53.

A water inlet pipe 57 extends from a sink or other plumbing fixture (not shown) and enters the side of the casing 50 at one side thereof and closely adjacent the bottom of the casing. The water together with the accumulated grease from the sink will pass through the water inlet pipe 57 and into the casing 50.

A water outlet pipe 58 enters the side of the casing 50 closely adjacent the top thereof and has its outer end connected to the usual sewerage system to carry away the waste water. The mouth 58ᵃ of the outlet pipe 58 is located closely adjacent the bottom wall of the casing 50 so that only water located in the bottom of the casing will enter the outlet pipe 58. This arrangement of the mouth 58ᵃ also causes the water to seek a level indicated by the dot and dash line 59, so that the grease which enters the casing 50 will float on the surface of the accumulated water above the level of the mouth 58ᵃ of the outlet pipe 58.

The bend of the outlet pipe 58, within the casing 50, is formed with a removable plug 60 which can be removed when the cover 33 is removed permitting a flexible wire to be forced into the outlet pipe 58 to relieve congestions which might develop in the outlet pipe.

When it is desired to clean the inside of the casing 50 it is merely necessary to remove the cover 53 permitting the excess grease to be scooped off the surface of the water contained within the casing 50. In other respects this form of the invention is similar to the previous forms and further detailed description of the operation is believed to be unnecessary.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described by invention, what I claim as new and desire to secure by United States patent is:

1. A grease trap for a sink or the like, comprising a hollow casing, a water inlet pipe connected to said casing adjacent its bottom, a water outlet pipe entering said casing at one side closely adjacent its top and a bent pipe integral with said casing adjacent the water outlet pipe and having its mouth closely adjacent the bottom of said casing, and a closed discharge opening at the bottom of said casing, and a cup-shaped member within said casing for containing the accumulated grease and water and fitting in sealing engagement with the inner wall of said casing to prevent accumulations therebetween, said casing being formed of an upper section and a bottom section, and means connecting said sections together so that they can be separated to permit removal of said cup-shaped member when desired, said pipes being threaded into bosses formed on the sides of said upper section, and an outlet tube within said casing aligned with said bent pipe, said cup-shaped member being formed with a cutout extended about said outlet tube, said cup shaped member being slidably received in said casing to be urged against the outlet pipe when in sealing relation and being lowered when grease is to be removed.

2. A grease trap for a sink or the like, comprising a hollow casing, a water inlet pipe connected to said casing adjacent its bottom, a water outlet pipe entering said casing at one side closely adjacent its top and a bent pipe integral with said casing adjacent the water outlet pipe and having its mouth closely adjacent the bottom of said casing, and a closed discharge opening at the bottom of said casing, and a cup-shaped member within said casing for containing the accumulated grease and water and fitting in sealing engagement with the inner wall of said casing to prevent accumulations therebetween, said casing being formed of an upper section and a bottom section, and means connecting said sections together so that they can be separated to permit removal of said cup-shaped member when desired, said pipes being threaded into bosses formed on the sides of said upper section, and an outlet tube within said casing aligned with said bent pipe, said cup-shaped member being formed with a cutout extended about said outlet tube, said cup shaped member being slidably received in said casing to be urged against the outlet pipe when in sealing relation and being lowered when grease is to be removed, said cup-shaped member being formed with a hole aligned with said inlet pipe when said cutout is engaged about said outlet tube.

3. A grease trap for a sink or the like, comprising a hollow casing, a water inlet pipe connected to said casing adjacent its bottom, a water outlet pipe entering said casing at one side closely adjacent its top and a bent pipe integral with said casing adjacent the water outlet pipe and having its mouth closely adjacent the bottom of said casing, and a closed discharge opening at the bottom of said casing, and a cup-shaped member within said casing for containing the accumulated grease and water and fitting in sealing engagement with the inner wall of said casing to prevent accumulations therebetween, said casing being formed of an upper section and a bottom section, and means connecting said sections together so that they can be separated to permit removal of said cup-shaped member when desired, said pipes being threaded into bosses formed on the sides of said upper section, and an outlet tube within said casing aligned with said bent pipe, said cup-shaped member being formed with a cut out extended about said outlet tube, said cup shaped member being slidably received in said casing to be urged against the outlet pipe when in sealing relation and being lowered when grease is to be removed, and means for sealing the engagement of said cutout about the bottom half of said outlet tube.

4. A grease trap for a sink or the like, comprising a hollow casing, a water inlet pipe connected to said casing adjacent its bottom, a water outlet pipe entering said casing at one side closely adjacent its top and a bent pipe integral with said casing adjacent the water outlet pipe and having its mouth closely adjacent the bottom of said casing, and a closed discharge opening at the bottom of said casing, and a cup-shaped member within said casing for containing the accumulated grease and water and fitting in sealing engagement with the inner wall of said casing to prevent accumulations therebetween, said casing being formed of an upper section and a bottom section, and means connecting said sections together so that they can be separated to permit removal of said cup-shaped member when desired, said pipes being threaded into bosses formed on the sides of said upper section and an outlet tube within said casing aligned with said bent pipe, said cup-shaped member being formed with a cutout extended about said outlet tube, said cup shaped member being slidably received in said casing to be urged against the outlet pipe when in sealing relation and being lowered when grease is to be removed, and means for sealing the engagement of said cutout about the bottom half of said outlet tube, and means for raising said cup-shaped member into sealing engagement with said outlet tube and relative to said casing.

References Cited in the file of this patent

UNITED STATES PATENTS

| Number | Name | Date |
|---|---|---|
| 252,869 | Erwin | Jan. 31, 1882 |
| 541,208 | Knispel | June 18, 1895 |
| 986,268 | Colina et al. | Mar. 7, 1911 |
| 1,444,132 | Ninow et al. | Feb. 6, 1923 |
| 1,679,191 | Westbrook | July 31, 1928 |
| 1,982,348 | Luff | Nov. 27, 1934 |
| 2,103,316 | Boosey | Dec. 28, 1937 |
| 2,576,645 | Shenk | Nov. 27, 1951 |